United States Patent [19]
Zereski, Jr. et al.

[11] Patent Number: 5,654,886
[45] Date of Patent: Aug. 5, 1997

[54] MULTIMEDIA OUTDOOR INFORMATION SYSTEM

[75] Inventors: Donald P. Zereski, Jr., Princeton; Bradley M. Taber, III, Saugus, both of Mass.

[73] Assignee: WSI Corporation, Billerica, Mass.

[21] Appl. No.: 403,481

[22] Filed: Mar. 14, 1995

[51] Int. Cl.$^6$ .............................. G01W 1/00; G06F 19/00
[52] U.S. Cl. ..................... 364/420; 395/200.48; 395/807
[58] Field of Search ................................ 364/420, 514 A; 395/100, 118, 144, 152, 153, 154, 155; 342/26; 348/13, 14; 455/4.1, 4.2

[56] References Cited

U.S. PATENT DOCUMENTS

| 5,517,193 | 5/1996 | Allison et al. ........................ 342/26 |
| 5,537,546 | 7/1996 | Sauter .................................. 395/200.1 |

OTHER PUBLICATIONS

Olsen, "Internet Opens World of Weather; Weather Service Develops Programming for Access to its Servers" Government Computer News, v. 13, N. 19, p. 58.

*Primary Examiner*—Ellis B. Pamirez
*Assistant Examiner*—M. Kemper
*Attorney, Agent, or Firm*—Wolf, Greenfield & Sacks, P.C.

[57] ABSTRACT

Multimedia presentations of outdoor information, such as weather information and ski reports, are provided on information transmission networks, such as Internet, on-line services and interactive TV. The outdoor information is compiled from a plurality of sources by electronically transmitting it to a presentation generator. The outdoor information is converted into presentation information for generating multimedia presentations. The presentation information is stored in a computer database that is accessible through the network. When a request is received from a user device connected to the network for selected outdoor information, the presentation information corresponding to the selected outdoor information is transmitted from the database to the user device through the information transmission network. A multimedia presentation is generated at the user device. The multimedia presentation may include a graphic display of a meteorologist's weather forecast and an audio reproduction of the meteorologist's oral weather forecast. Other outdoor information, such as ski reports, road conditions and the like, may be selected.

25 Claims, 10 Drawing Sheets

INTELLICAST
USA WEATHER

| USA WEATHER | AROUND THE WORLD | SKI REPORT |
| 122 | 124 | 126 |

120 usa weather report sections:
- ☐ tomorrow's weather outlook
- ☐ images and movies to download
- ☐ selected cities forecast & links to local weather
- ☐ yesterday's extremes tomorrow's weather outlook

Last updated Thursday, 09-Mar-95 17:03:13 EST
BETA USERS: This image and associated sound files are not updated daily !

*Click on a city for local weather*

[Map: Friday 3/10/95 — Seattle 49, San Francisco 59, Denver 51, Los Angeles 69, Chicago 30, Boston 32, New York 36, Atlanta 58, Dallas 78, Miami 87]  —130 meteorologist John Doe's USA outlook

| MS-Windows sound file | (WAV) | 351,290 bytes |
| Basic audio file | (AU) | 351,221 bytes |

132 weather images and movies

National radar
latest image                19,732 bytes

Fig. 6

National clouds
latest image                    21,784 bytes selected cities forecast

*Click on a city for more local weather*

```
selected cities weather summary and forecast
national weather service-washington d.c.
7 30am est fri mar 10 1995 temperatures indicate daytime high..nighttime low
b indicates temperature below zero
precipitation for 24 hours ending at 7 am est
```

A B C D E F G H I J K L M N O P Q R S T U V W X Y Z

|  |  |  | forecast<br>fri....mar 10 |  | forecast<br>sat....mar 11 |
|---|---|---|---|---|---|
| city | thu...mar 09<br>hi/lo | pcpn | wea | hi/lo | wea | hi/lo |
| abilene tx | 59 41 |  |  | ptcldy 65/46 | ptcldy | 71/53 |
| akron canton | 24 10 | .02 | ptcldy 38/31 | sunny | 60/42 |
| albany ny | 28 10 |  | sunny 32/08 | cloudy | 41/28 |
| albuquerque | 64 38 |  | fair 72/42 | ptcldy | 70/41 |
| allentown | 32 18 |  | ptcldy 39/19 | sunny | 50/30 |
| amarillo | 66 29 |  | sunny 72/40 | windy | 75/41 |
| anchorage | 35 06 |  | sunny 25/12 | vrycld | 20/07b |
| asheville | 36 19 |  | sunny 52/25 | sunny | 65/35 |
| atlanta | 51 32 |  | sunny 56/37 | sunny | 67/46 |
| atlantic city | 37 20 |  | sunny 40/27 | sunny | 45/39 |
| austin | 61 42 |  | ptcldy 66/50 | mocldy | 72/54 |
| baltimore | 37 22 |  | ptcldy 43/25 | sunny | 54/35 |
| baton rouge | 63 34 |  | sunny 66/44 | ptcldy | 73/52 |
| billings | 60 48 |  | windy 64/44 | windy | 64/38 |
| birmingham | 51 27 |  | sunny 61/34 | sunny | 68/44 |
| bismarck | 23 01 |  | ptcldy 45/27 | ptcldy | 45/27 |
| boise | 62 51 | .02 | shwrs 59/42 | shwrs | 54/31 |
| boston | 60 19 | .01 | sunny 36/20 | ptcldy | 36/27 |
| bridgeport | 34 18 |  | sunny 38/20 | ptcldy | 40/28 |
| brownsville | 68 49 |  | ptcldy 73/54 | ptcldy | 78/60 |
| buffalo | 23 10 |  | ptcldy 34/25 | ptcldy | 54/37 |
| burlington | 22 06 |  | sunny 37/06 | cloudy | 37/25 |
| caribou | 29 03 | .15 | sunny 15/05b | sunny | 26/04 |
| casper | 59 44 |  | windy 63/42 | windy | 59/34 |
| charleston sc | 52 36 |  | sunny 55/36 | sunny | 66/45 |
| charleston wv | 29 13 |  | sunny 45/27 | sunny | 63/38 |
| charlotte | 45 26 |  | sunny 53/31 | sunny | 65/42 |
| chattanooga | 45 28 |  | sunny 57/30 | sunny | 69/40 |
| cheyenne | 64 35 |  | windy 65/40 | windy | 60/35 |
| chicago | 36 29 |  | sunny 49/35 | sunny | 60/45 |
| cincinnati | 33 22 |  | ptcldy 49/35 | sunny | 65/46 |
| cleveland | 25 09 |  | ptcldy 38/30 | sunny | 60/42 |
| colorado spgs | 66 36 |  | sunny 68/39 | ptcldy | 66/40 |

INTELLICAST USA WEATHER boston 122  124  126

| USA WEATHER | AROUND THE WORLD | SKI REPORT | boston metro area weather report sections:
- four day forecast
- images and movies    to download
- weather history    records and facts for boston boston four day forecast    146

Four Day Forecast Boston Metro Area

| Fri | Sat | Sun | Mon |
|-----|-----|-----|-----|
|     |     |     | 55° |
| 150 |     | 43° | 36° |
| 152 |     |     |     |
| 36° | 36° | 27° |     |
|     | 27° |     |     |
| 20° |     |     |     |

154

ADVERTISEMENT

IMAGE OF METEOROLOGIST    142

140 today: sunny cool and breezy. high in the mid 30's northwest wind 15 to 25 mph...diminishing to 10 to 20 mph during the afternoon.

tonight: clear and cold. low around 20 near the coast...15 to 20 inland. northwest wind around 10 mph.    144 saturday: partly sunny. high 35 to 40.

sunday: fair. lows in the 20s. highs in the 40s.

monday: fair lows in the 30s. highs in the 50s.

tuesday: fair. lows 35 to 45. highs 55 to 65.

as of 424 am est fri mar 10 1995

Fig. 8

MULTIMEDIA OUTDOOR INFORMATION SYSTEM

FIELD OF THE INVENTION

This invention relates to computerized outdoor information systems and, more particularly, to multimedia outdoor information systems and methods wherein easily understood, user-friendly multimedia presentations are automatically generated from meteorologist's weather forecasts, weather data, ski reports, and the like. The multimedia presentations are made available on computer networks, such as Internet, on-line services, and other information transmission networks.

BACKGROUND OF THE INVENTION

Recent communications technology has produced a new type of consumer—one that receives a significant portion of his or her mail and information electronically via the so-called "information superhighway". Organizations such as CompuServe, Prodigy and America On-Line currently link over six million users, via computer, to a wealth of information from stock reports to headline news and from travel information to weather forecasts. Even more impressive is the Internet, a worldwide array of interconnections allowing anyone with access not only to connect with anyone else, but to get information on virtually any subject 24 hours a day. Today Internet connects between 20 and 30 million users (about 50% commercial) and is growing at the surprising rate of 10% per month. In total there are currently 34,000 networks connected to one another worldwide. One estimate indicates that 100 million consumers will be tied directly or indirectly to Internet by 1998. A large percentage of personal computers sold today have high quality graphics and multimedia capability.

Various weather information is available on Internet and On-Line services. A TV station in Alabama provides an Internet weather report for one geographical location. The Internet report includes both audio and graphic information. A number of universities make weather maps and other weather data available on Internet. The information typically includes large quantities of weather data that may be meaningful to a meteorologist, but not to the average Internet user.

Accu-Weather, Inc. provides a dial-up service that includes weather information in the form of weather maps, satellite images, data and text. The information is apparently obtained from the National Weather Service and includes limited forecasts. Again, this service provides large quantities of weather data that may be meaningful to a meteorologist, but not to the average Internet user.

None of the known weather information services available on Internet or on-line services provide a simple, easily understood, user-friendly report of weather forecasts and other related outdoor information for different geographical locations. Nor do current weather information services take advantage of the multimedia capabilities of user machines by providing presentations that include graphics, text, animation and audio. An Internet user may wish to obtain a forecast of local weather conditions as an alternative to obtaining the forecast on television or radio. Furthermore, the Internet user may wish to obtain a simple, easily understood weather forecast or ski report for an area to which he is traveling, or simply as a matter of interest. Such presentations of outdoor information are not currently available.

SUMMARY OF THE INVENTION

According to a first aspect of the present invention, a weather information system and method are provided. The method comprises the steps of compiling weather information from a plurality of meteorologists in different geographical regions, converting the weather information from each of the meteorologists into presentation information for generating a multimedia weather presentation for each of the geographical regions, and storing the presentation information in a computer database that is accessible through an information transmission network. The weather information for each meteorologist includes weather forecast information generated by the meteorologist and an audio representation of the meteorologist's oral weather forecast. A request is received from a user device connected to the information transmission network for selected weather information. In response to the request, the presentation information corresponding to the selected weather information is transmitted from the database to the user device through the information transmission network for generating the multimedia weather presentation. The multimedia weather presentation includes a graphic display of the meteorologist's weather forecast and an audio reproduction of the meteorologist's oral weather forecast.

In a preferred embodiment, the information transmission network comprises a computer network, such as Internet or an on-line service. Alternatively, the information transmission network may comprise an interactive television network. The weather information from each of the meteorologists may be electronically transmitted to a presentation generator for conversion of the weather information into presentation information.

According to another aspect of the present invention, an outdoor information system and method are provided. Outdoor information from a plurality of sources is compiled by electronically transmitting the outdoor information from each of the sources to a presentation generator. The presentation generator converts the outdoor information from each of the sources into a presentation. Selected portions of the outdoor information are entered into a software presentation template representative of the presentation, and the completed presentation template is rendered into a digital representation of the presentation. The digital representation of the presentation is stored in a computer database that is accessible through an information transmission network. A request is received from a user device connected to the information transmission network for selected outdoor information. In response to the request, the digital representation of the presentation is transmitted from the database to the user device through the information transmission network for generating the presentation. The outdoor information may include weather information, ski reports, road conditions, and the like.

BRIEF DESCRIPTION OF THE DRAWINGS

For a better understanding of the present invention, reference is made to the accompanying drawings which are incorporated herein by reference and in which:

FIG. 6 is an example of a display screen showing U.S. weather, provided by the multimedia outdoor information system of the present invention;

FIG. 7 is an example of a display screen showing forecasts for selected U.S. cities, provided by the multimedia outdoor information system of the present invention;

FIG. 8 is an example of a display screen showing a local weather forecast, provided by the multimedia outdoor information system of the present invention;

DETAILED DESCRIPTION

Figure 1:
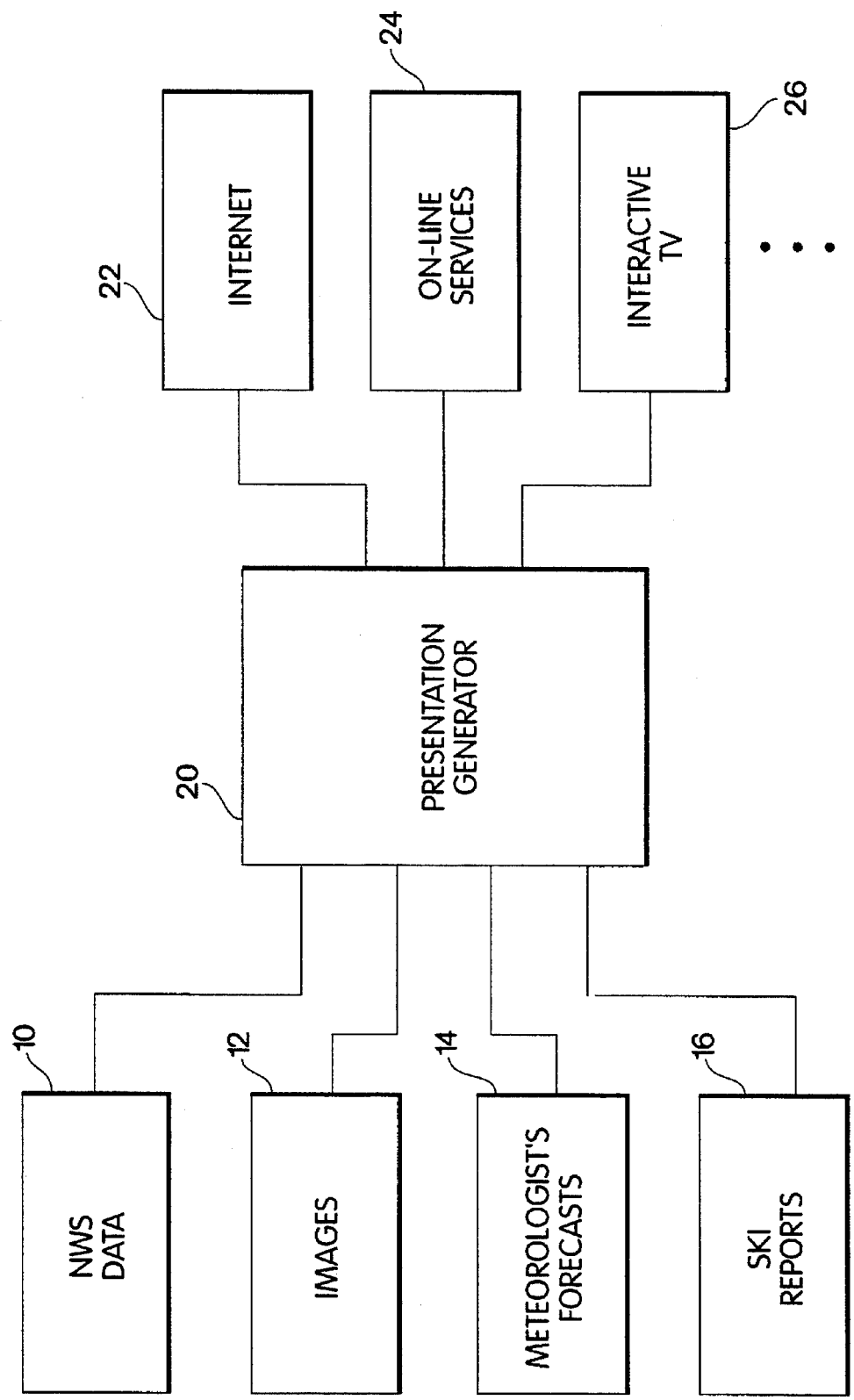
FIG. 1 is a block diagram of a multimedia outdoor information system in accordance with the present invention.

A block diagram of a multimedia outdoor information system in accordance with the present invention is shown in FIG. 1. In general, the system collects outdoor related information from one or more sources of such information. The outdoor information includes weather information and may include such additional information as ski reports, road conditions, traffic conditions and the like. In the example of FIG. 1, the outdoor information sources include National Weather Service (NWS) data 10, images 12, such as radar maps and cloud images, meteorologist's forecasts 14 and ski reports 16. The outdoor information is supplied to a presentation generator 20. The presentation generator 20 comprises a computer system having a database for storing the outdoor information received from the various sources. In a preferred embodiment, the outdoor information from the various sources is electronically transmitted to the presentation generator 20 at specified intervals, such as twice daily, to insure that current outdoor information is available. The presentation generator 20 converts the outdoor information into one or more multimedia presentations that may be made available on Internet 22, on-line services 24, such as CompuServe, Prodigy and America On-Line, interactive TV 26, and any other computer network or information transmission network. The multimedia presentations may include various combinations of graphics, text, animation and audio, that are reproduced by a user machine, such as a multimedia computer, a computer terminal or an interactive television. The multimedia presentations are designed to be easily understood by a relatively unsophisticated user.

The meteorologist's forecasts 14 are obtained from different meteorologists in different geographical regions and different cities. The meteorologists are preferably TV meteorologists that are known to the public in a particular region or city. As described below, each meteorologist's forecast is used to produce a highly informative multimedia localized weather forecast presentation that is made available on Internet and other on-line services. For quality and a high degree of accuracy, the local forecasts utilize meteorologists that are known within the geographical region of the forecast area. By providing reports from local meteorologists, the multimedia presentations are given a personal touch and the user feels more comfortable with the report. The forecasts are preferably produced twice per day but may be produced several times per day and preferably are electronically transmitted to the presentation generator for conversion into a graphic format.

The procedure followed by the local meteorologist may be as follows. The local meteorologist prepares a weather forecast as part of his normal daily routine. The meteorologist then prepares the forecast information for transmission to the presentation generator 20 utilizing one of several methods. In a preferred method, the meteorologist uses a personal computer (PC) having specialized software for entering the forecast information. For example, the specialized software may generate a form for the required weather forecast information. The meteorologist enters the forecast information requested by the form. Such information typically includes forecast temperature ranges for a specified number of days and forecast weather conditions for each day of the forecast (for example, cloudy, sunny, rain, snow, etc.). In addition, the meteorologist records an oral forecast of specified length. The oral forecast is converted to a digital representation of the audio signal. Typically, the forecast is prepared for 3 to 5 days. After all information is entered, the meteorologist's PC uses a communication link to transmit the forecast information to the presentation generator 20 for storage and processing.

In an alternative method, meteorologists who do not have the specialized software described above can enter the weather forecast information into a computer capable of accessing the Internet. The information is electronically transmitted via e-mail to the presentation generator 20.

In yet another alternative, the meteorologist can complete a paper form that is sent by facsimile to the location of the presentation generator 20. Operators at the location of the presentation generator enter the required information into the presentation generator. The audio component of the meteorologist's forecast is handled by the meteorologist calling a voice mail facility at the presentation generator location. The audio message is captured and input to the presentation generator 20.

Other forms of outdoor information can be supplied to the presentation generator in a similar manner. A wide variety of National Weather Service data is available. That data includes basic weather data as well as forecasts for different geographical regions. Images, such as radar images and cloud maps, may be obtained from WSI Corporation of Billerica, Mass. Ski reports may be obtained from Snow Country Reports of Woodstock, Vt. In a manner similar to that described above, the ski reports are electronically transmitted to the presentation generator 20. As noted above, additional sources of outdoor information may include road conditions for different geographical regions and traffic conditions in urban areas.

Figure 2:
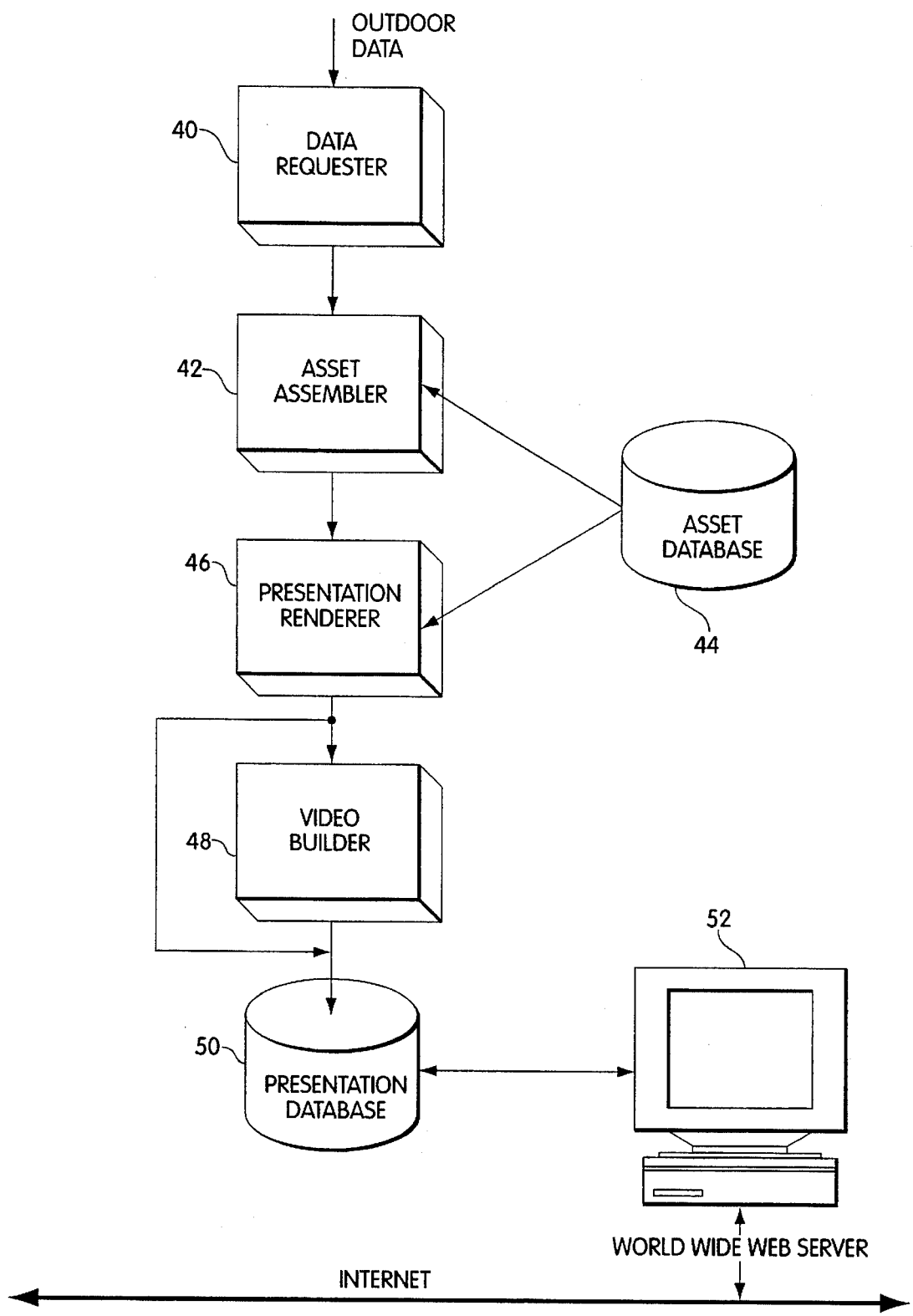
FIG. 2 is a block diagram showing the operations performed by the presentation generator.

A block diagram of the major components of the presentation generator is shown in FIG. 2. As indicated above, various outdoor information, including text and images, is transmitted to the presentation generator 20 at specified intervals. This information is stored in a database for use by the presentation generator. In general, the presentation generator operates by the use of presentation templates. A presentation template is a description of a particular multimedia presentation that may be made available by the system, for example, on Internet. The presentation is reproduced at a user computer, which preferably has multimedia capabilities. A presentation typically includes graphics and text that appear on the display screen of the user computer. In addition, some of the presentations include audio, such as a meteorologist's oral weather forecast. The graphic information may occupy a single display screen or may be sufficiently long to require scrolling at the user computer. In addition, the presentation may include animation, a series of video frames that give the impression of movement. Examples of presentations are shown in FIGS. 5–10. The presentation generator takes the required information obtained from the various sources and fills in each template.

The completed template is then rendered into a presentation which may be available on Internet and other on-line services.

As shown in FIG. 2, a data requester 40 acquires the text, images and audio that are needed to build a particular presentation. An asset assembler 42 uses the data provided by the requester 40 to fill in the presentation templates. An asset database 44 contains presentation templates, graphics, such as icons that appear on the presentations, and advertising. A presentation renderer 46 transforms the completed template into one or a series of image frames. When animation or audio is used, a video builder 48 compresses the series of image frames provided by the presentation renderer 46 into industry standard video file formats. The output of the video builder 48 is a presentation file that is stored in a presentation database 50. When the presentation is a single graphic image frame, the presentation renderer 46 supplies the presentation file directly to the presentation database 50. The presentation database 50 is made available to a world wide web server 52 connected to the Internet. The presentation files in the presentation database are thereby available for access on Internet.

The presentation generator 20 can, for example, be implemented as a Pentium-based or 486-based PC, preferably in a network configuration. When additional computing power is needed, the tasks can be shared among the PCs in the network. The databases for the presentation generator can be implemented using the Microsoft Access database software. The software for the presentation generator may be written in the C++ programming language. It will be understood that other implementations are included within the scope of the present invention.

Figure 3:
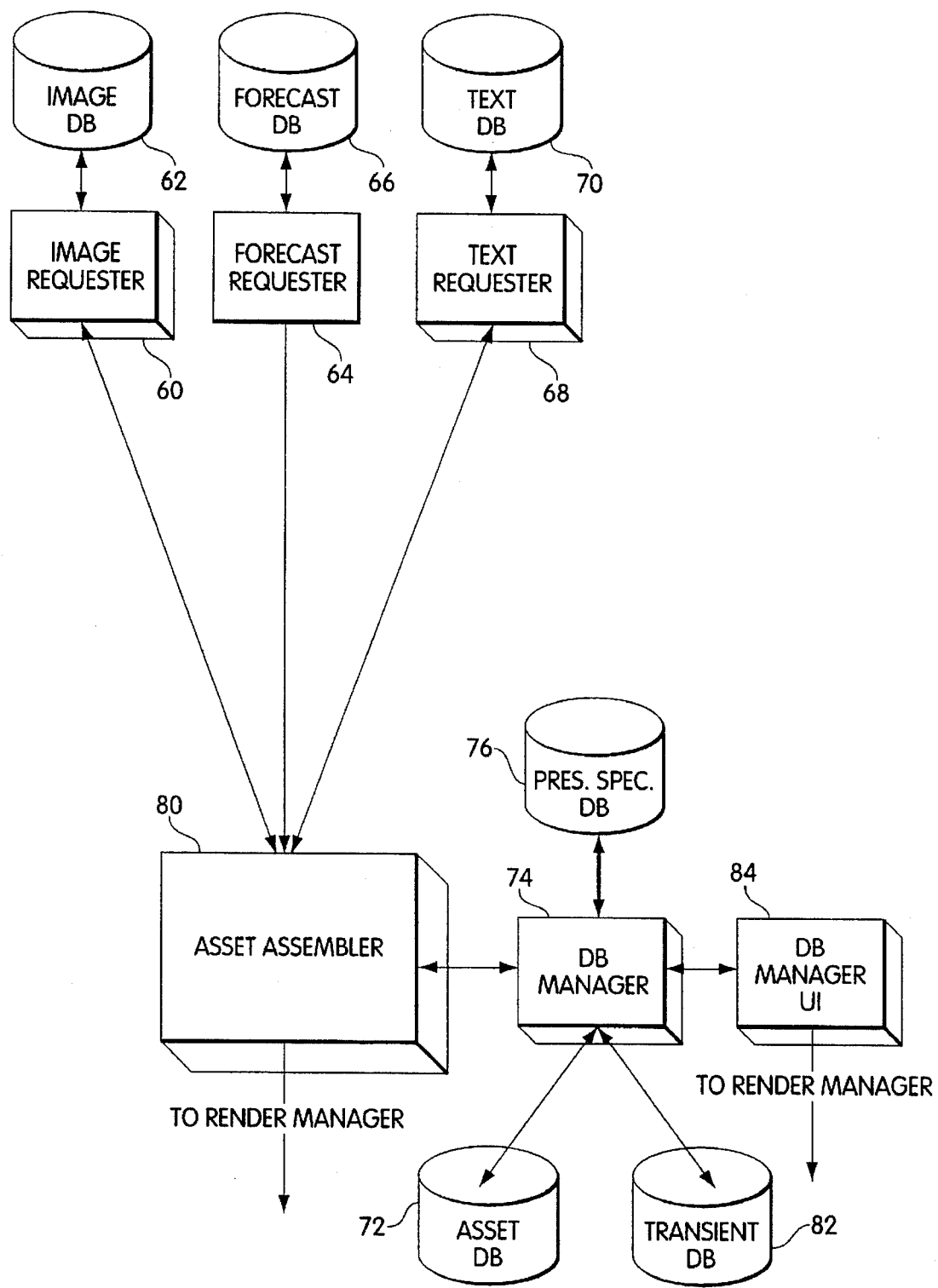
FIG. 3 is a more detailed block diagram of the requester and asset assembler shown in FIG. 2.

A more detailed block diagram of the requester and asset assembler is shown in FIG. 3. The data requester 40 (FIG. 2) may include a requester for each source of data. In the example of FIG. 3, an image requester 60 polls an image database 62 for imagery. A forecast requester 64 polls a forecast database 66 for meteorologist's forecast information. A text requester 68 polls a text database 70 for text data. As indicated above, the presentation generator uses templates for defining each multimedia presentation to be generated. An asset database 72 stores the various presentation templates used by an asset assembler 80 in generating the multimedia presentations. In addition, the asset database 72 holds icons, advertisements, and other graphics of a fixed nature that may be assembled into the presentations. Access to the asset database 72 is through a database manager 74. A presentation specification database 76 contains orders to build presentations. The presentation database 76 specifies that the system is to collect data and build specified presentations at certain times. For example, the system may generate multimedia presentations of each meteorologist's forecast twice daily.

The image requester 60 polls the image database 62 for imagery and passes the information to the asset assembler 80. The image requester 60 receives instructions that specify data type, data location and frequency of data collection. This module contains an image converter which converts the format of the imagery into a standard format. The converted data is sent to the asset assembler 80 with header information describing the data.

The text requester 68 polls the text database 70 for text data and passes it along to the asset assembler 80. The text requester 68 contains a poller which receives polling instructions from the asset assembler 80. Instructions to the text requester 68 specify data type, data location and frequency of data collection. This module contains a parser which parses text and extracts specific data. The extracted data is sent to the asset assembler 80 with header information describing the data.

The forecast requester 64 polls the forecast database 66 for meteorologist's forecast information as required to build a presentation. For example, the presentation may require the forecast high and low temperatures for specified days, as well as forecast weather conditions.

The information obtained by the requesters 60, 64 and 68 is sent to the asset assembler 80, which temporarily stores the data in a transient database 82. The transient database 82 holds the raw data needed to build presentations. The data includes radar satellite images, National Weather Service text, and meteorologist's forecast information.

A database manager 84 is an MS windows graphical user interface that allows users to make changes to the databases. The user may add, delete or change presentation specifications, add or remove data from the transient database 82 and add or remove assets from the asset database 72. Access to these databases is through the database manager 74.

The asset assembler 80 is the coordinator of the system. The asset assembler 80 contains a presentation specification reader, which extracts instructions for its own operation and instructions to be sent to the requesters. A coordinator collects and distributes data from the requesters. The coordinator also determines when all the data is available for a particular presentation. A resolver resolves the data into database references. The asset assembler 80 contains an assembler which assembles all of the pieces and parts that define a complete presentation. The presentation definition and the data header are sent to a renderer manager 90 (FIG. 4).

The requester and asset assembler shown in FIG. 3 operate as follows. Text, imagery and forecasts, and any other outdoor information are input to the databases 62, 66 and 70 as described above. The asset assembler 80 determines from the presentation specification database 76 that a particular presentation is to be built. The requesters 60, 64 and 68 extract the required information from the databases 62, 66 and 70 and transfer that information to the transient database 82. The asset assembler 80 can now build a presentation using the presentation template in asset database 72, the data stored in the transient database 82 and the graphic images and icons stored in asset database 72. Assume, for example, that the Boston weather forecast presentation shown in FIG. 8 is to be built. The presentation template specifies the format of the four-day forecast graphic and the placement of the icons and the advertisement on the four-day forecast graphic. The asset assembler 80 obtains the temperature range and the appropriate forecast icon 150 for each forecast day from the transient database 82 enters them into the four-day forecast graphic 140. The text summary 144 of the forecast is stored in the transient database 82 and may also be placed in a template. Then the fixed components of the presentation, such as advertisement 146, are obtained from the asset database 72 and are entered into the template. It will be understood that the information entered into the template is a reference to the appropriate database location for the required information. For example, the template may specify a location of the advertisement on the presentation and a database reference where a bit map of the advertisement is located. After the template is completely filled in, the asset assembler 80 sends the presentation description to the renderer manager 90.

Figure 4:
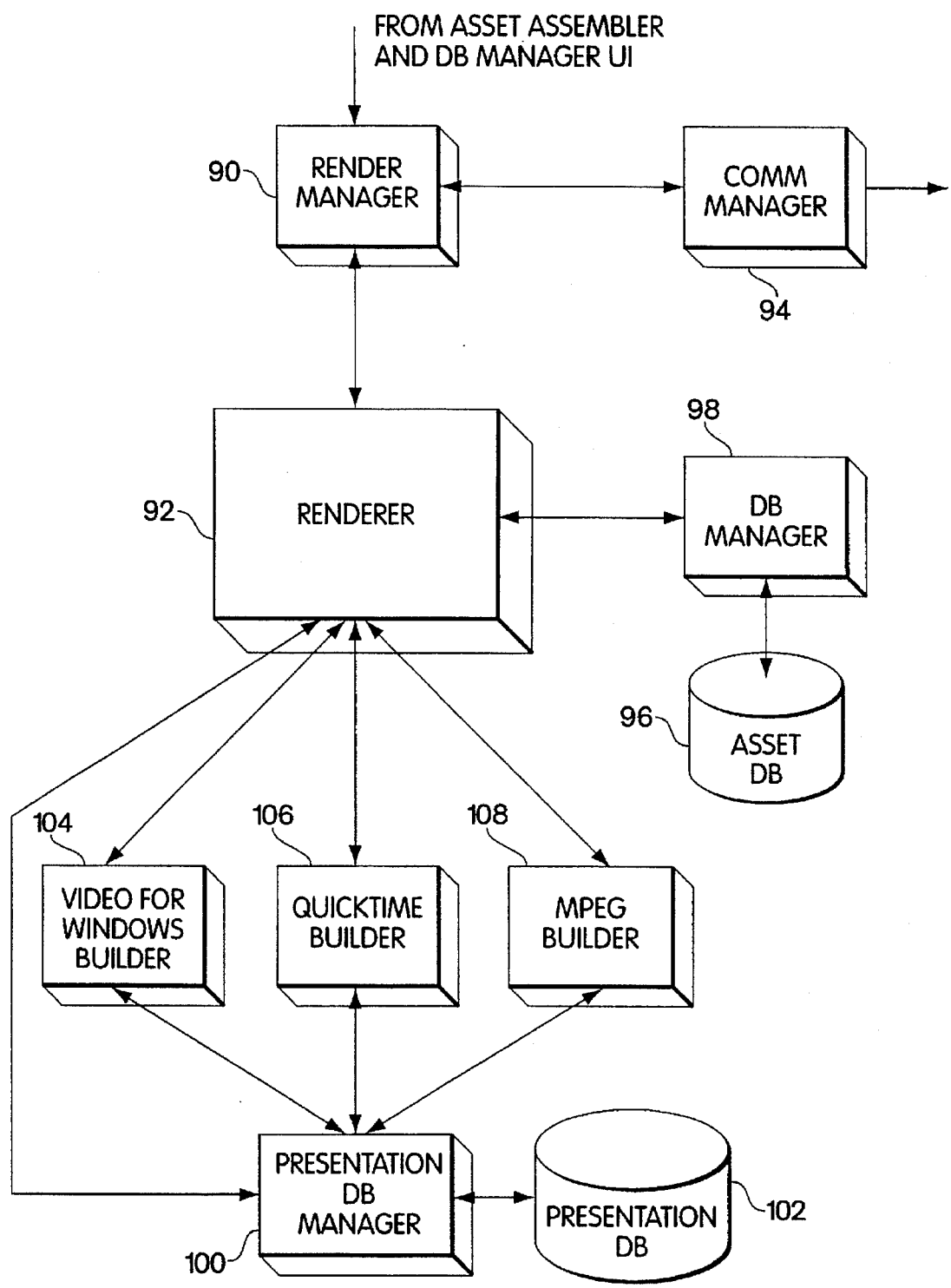
FIG. 4 is a more detailed block diagram of the presentation renderer, video builder and presentation database shown in FIG. 2.

The presentation renderer block diagram is shown in FIG. 4. The renderer manager 90 supplies template information to a renderer 92. In a preferred embodiment, the renderer 92 may contain several renderers which may operate in parallel on different presentations. The renderer 92 converts a template, or presentation description, into one or more image frames. The renderer manager 90 routes the presentation description to the least busy renderer or to a communication manager 94, which permits completed template information to be transmitted to other presentation generators. The renderer 92 operates in conjunction with a database 96 and a database manager 98.

The renderer 92 converts the completed templates into bit maps of graphic images. For example, with reference to FIG. 8, the renderer 92 compiles the bit map of the four-day forecast graphic 140 and the advertisement 146 of the presentation into a single bit map that represents the image to be displayed on the user's screen. In the case of a single frame presentation, the data is sent directly to a presentation manager 100. The presentation database manager 100 stores the final presentation in a presentation database 102. When the presentation contains animation or audio, the rendered presentation is supplied to one of several video builders for conversion and compression into industry standard format video files. A Video for Windows builder 104 obtains the presentation information from the renderer 92 and converts it to an AVI formatted movie file. A QuickTime builder 106 obtains the presentation information from the renderer 92 and converts it to a QTW formatted movie file. An MPEG builder 108 obtains the presentation information from the renderer 92 and converts it to an MPG formatted movie file. In each case, the video builder passes the converted data to the presentation database manager 100 for storage in the presentation database 102.

The audio associated with the presentation, in digital format, is specified in the presentation template. Since the audio is not placed on a graphic image, it simply remains associated with the presentation template and, after rendering of the presentation, is stored with the other information for the presentation in the presentation database 102. When audio is associated with animation, the audio is supplied to one of the builders 104, 106 or 108. The video builder incorporates the audio into the converted information that is supplied to the presentation database manager 100.

The information in the presentation database 102 may then be made available for access on Internet, on-line services and other information transmission networks. In particular, with reference to Internet, the presentation information is made available through the World Wide Web of Internet. As known in the art, this is done by running on a computer connected to the Internet an HTTP daemon, which accesses the presentation database in response to user requests.

Figure 5:
FIG. 5 is an example of an initial display screen, provided by the multimedia outdoor information system of the present invention.

In use, an Internet user can access the presentation database through Internet. It will be understood that the presentation database will typically contain a large number of presentations for different geographical regions and cities and for different subjects such as weather, ski reports, road conditions, etc. Upon first accessing the outdoor information service, the user may see a screen display as shown in FIG. 5. A menu bar 120 includes a selection 122 for U.S. weather, a selection 124 for world weather and a selection 126 for ski reports. Additional menu selections may be added to access other outdoor information. One of the items is selected by pointing and clicking ("clicking") on the desired selection using a conventional pointing device, such as a mouse. Upon selecting U.S. weather, the presentation shown in FIG. 6 is obtained. A U.S. weather map 130 indicates temperatures and weather conditions for several major U.S. cities. The presentation may also include an image 132 of the meteorologist that supplied the information on the U.S. forecast map. The user can obtain a more detailed local weather forecast by clicking on one of the cities indicated on the U.S. map. Alternatively, the user may scroll to a tabulation 136 of forecasts for selected cities, as shown partially in FIG. 7. The tabulation 136 may provide, for example, forecast high and low temperatures and forecast weather conditions for several days for each listed city. The user may click on one of the listed cities in tabulation 136 to obtain more detailed local forecast information.

A typical local forecast presentation is shown in FIG. 8. The local forecast presentation may include several components, including four-day forecast graphic 140, image 142 of the meteorologist that provided the local forecast, text summary 144 of the local forecast, advertisement 146 and an audio reproduction (not shown) of the meteorologist's oral forecast. As described above, the meteorologist's oral forecast is transmitted by the meteorologist to the presentation system 20 and is compiled into a multimedia presentation for transmission on the Internet. Thus, users having a machine with multimedia capability, such as a multimedia computer, obtain a multimedia presentation of the local forecast information. The text summary 144 of the forecast is provided for users that do not have audio capability.

The four-day forecast graphic 140 includes for each forecast day an icon 150 that represents the forecast condition (sunny, partly cloudy, possible tornadoes, etc.) and a bar 152 that represents the forecast temperature range. The numerical values of the forecast high and low temperatures are positioned in the bar 152. The vertical height of the bar 152 graphically represents the forecast temperature range, whereas the vertical position of the bar 152 in a space 154 represents the absolute values of the forecast temperatures. Thus, the user can easily determine temperature trends with reference to the temperature bars 152 on the four-day forecast graphic 140. For example, with reference to FIG. 8, it is apparent that the forecast temperatures are moderating over a period of Saturday to Monday.

It will be understood that the presentations, such as the local weather forecast presentation shown in FIG. 8, can have a wide variety of formats. For example, the placements of the four-day forecast graphic 140, the image 142 of the meteorologist, the text summary 144 and the advertisement 146 can be varied to obtain a desired appearance. Furthermore, individual components of the presentation can be changed or omitted. For example, the four-day forecast graphic 140 may cover more or fewer days and may have a different format for each forecast day.

The multimedia presentations, such as the local weather forecast shown in FIG. 8, are designed to be user-friendly. That is, the information presented is relatively simple and easily understood by an unsophisticated user. In addition, the combination of the image 142 of the meteorologist, four-day forecast graphic 140 and the audio reproduction of the meteorologist's forecast give an impression that is similar to the meteorologist's forecast seen by users on local TV. Thus, the user will feel comfortable with the presentation format. This is contrasted with prior art weather information that is highly technical, and is designed for use by meteorologists.

Figure 9:
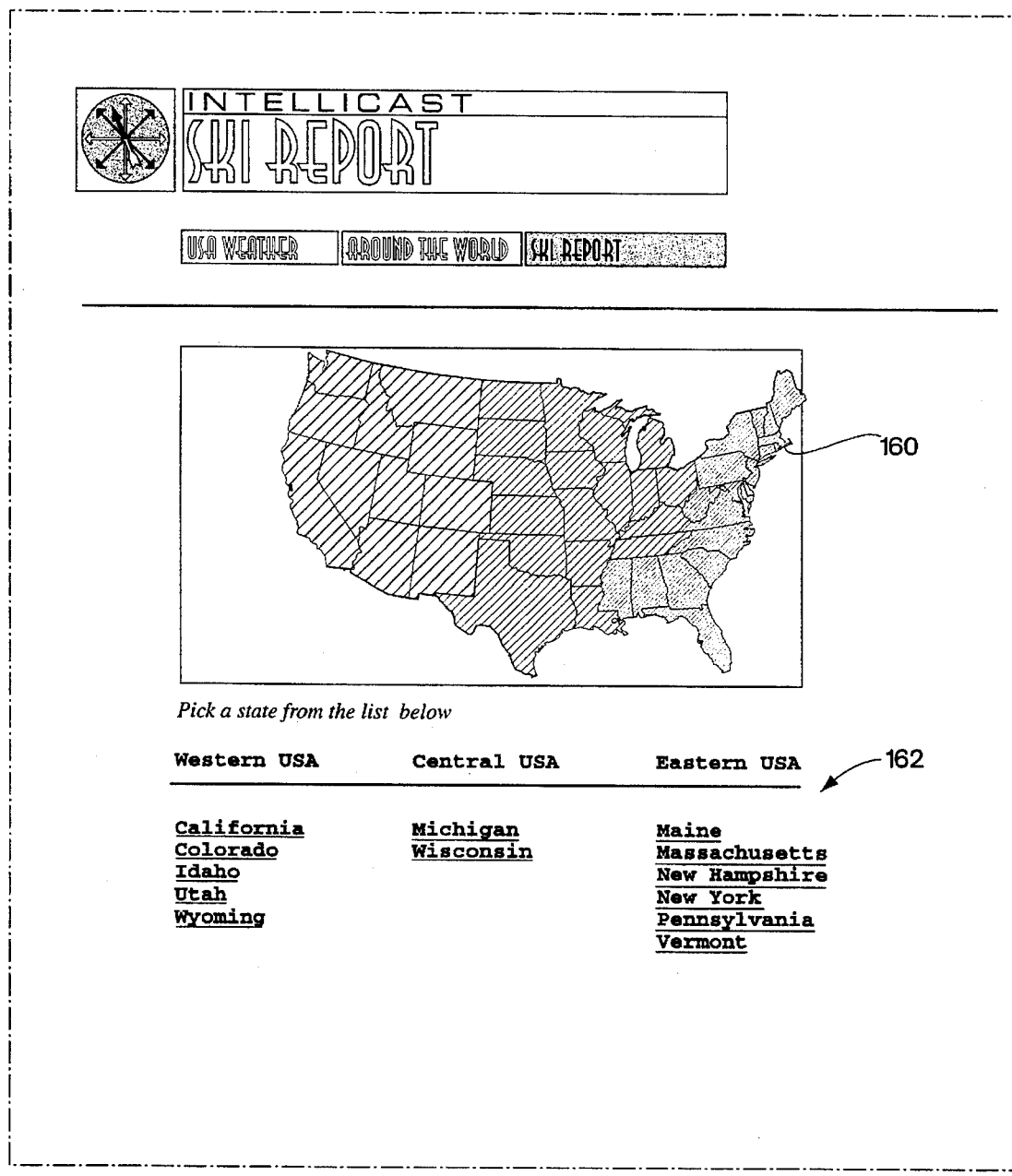
FIG. 9 is an example of a display screen showing ski report selections, provided by the multimedia outdoor information system of the present invention.
Figure 10:
FIG. 10 is an example of a display screen showing a selected state ski report, provided by the multimedia outdoor information system of the present invention.

By clicking on selection 126 of menu bar 120 (FIG. 5, FIG. 6 or FIG. 8), the user may obtain a ski report as shown in FIGS. 9 and 10. An initial presentation shown in FIG. 9 includes a U.S. map 160 that may be color coded to indicate different regions. A list 162 indicates states within each region where ski reports are available. By clicking on a state of interest, the user obtains a state ski report as shown in FIG. 10. The state ski report may include a table 164 that lists each ski area within the state and the ski conditions for each ski area. As in the case of weather forecasts, the ski report may include graphic representations of ski conditions, audio reproductions of oral ski reports and the like. In addition, by clicking on one of the listed ski areas, the user can obtain more detailed information regarding the selected ski area. Examples of such information include, for example, information regarding accommodations local to the ski area.

The outdoor information system has been described in connection with weather forecast information and ski reports. As noted above, the system may provide additional categories of outdoor information. Similar weather forecast information may be provided for foreign cites and countries. Additional information types may include road conditions, which may be of particular interest during winter storms, and traffic conditions in urban or other congested areas. The disclosed system permits users of Internet, on-line services and other computer and information transmission networks to obtain information of the type that is easily understood and is not available from other sources.

While there have been shown and described what are at present considered the preferred embodiments of the present invention, it will be obvious to those skilled in the art that various changes and modifications may be made therein without departing from the scope of the invention as defined by the appended claims.

We claim:

1. A method for providing weather information, comprising the steps of:

compiling weather information from a plurality of meteorologists in different geographical regions, said weather information including, for each meteorologist, weather forecast information generated by the meteorologist and an audio representation of the meteorologist's oral weather forecast;

converting said weather information from each of said meteorologists into presentation information for generating a multimedia weather presentation for each of said geographical regions;

storing said presentation information in a computer database that is accessible through an information transmission network;

receiving a request from a user device connected to the information transmission network for selected weather information; and in response to said request, transmitting said presentation information corresponding to the selected weather information from said database to the user device through said information transmission network for generating said multimedia weather presentation, said multimedia weather presentation including a graphic display of the meteorologist's weather forecast and an audio reproduction of the meteorologist's oral weather forecast.

2. A method for providing weather information as defined in claim 1 wherein the information transmission network comprises a computer network and said user device comprises a multimedia computer.

3. A method for providing weather information as defined in claim 1 wherein the information transmission network comprises an interactive television network and said user device comprises an interactive television.

4. A method for providing weather information as defined in claim 1 wherein the multimedia weather presentation further includes a graphic image of the meteorologist for the selected geographical region.

5. A method for providing weather information as defined in claim 1 wherein the graphic display of the meteorologist's weather forecast includes a graphic representation of forecast temperature ranges for a predetermined forecast period.

6. A method for providing weather information as defined in claim 5 wherein the graphic display of the meteorologist's weather forecast further includes an icon representative of the forecast weather condition for each day in the forecast period.

7. A method for providing weather information as defined in claim 5 wherein the graphic representation of forecast temperature ranges includes, for each day in the forecast period, a symbol having a vertical height that is representative of forecast temperature range and a vertical position that is representative of forecast temperature.

8. A method for providing weather information as defined in claim 1 wherein the step of compiling weather information from a plurality of meteorologists includes electronically transmitting said weather information from each of said meteorologists to a presentation generator for conversion of said weather information into said presentation information.

9. A method for providing weather information as defined in claim 1 wherein the step of compiling weather information from a plurality of meteorologists includes each of said meteorologists completing a computer weather information form and electronically transmitting the weather information in said weather information form to a presentation generator for conversion of said weather information into said presentation information.

10. A method for providing weather information as defined in claim 1 wherein the step of converting said weather information into presentation information includes providing a software presentation template representative of said multimedia weather presentation, entering selected portions of said weather information into said presentation template to provide a completed presentation template, and rendering the completed presentation template into a digital representation of said multimedia weather presentation.

11. A method for providing weather information as defined in claim 1 wherein the multimedia weather presentation further includes animation comprising a series of related graphic display frames.

12. A method for providing weather information on a computer network, comprising the steps of:

compiling weather information from a plurality of meteorologists in different geographical regions by electronically transmitting said weather information from each of said meteorologists to a presentation generator, said weather information including, for each of said meteorologists, weather forecast information generated by the meteorologist and an audio representation of the meteorologist's oral weather forecast;

said presentation generator converting said weather information from each of said meteorologists into presentation information for generating a multimedia weather presentation for each of said geographical regions;

storing said presentation information in a computer database that is accessible through a computer network;

receiving a request from a user device connected to the computer network for said weather information for a selected geographical region; and in response to said request, transmitting said presentation information for the selected geographical region from said database to the user device through said computer network for generating said multimedia weather presentation, said multimedia weather presentation including a graphic display of the meteorologist's weather forecast and an audio reproduction of the meteorologist's oral weather forecast for the selected geographical region.

13. A method for providing weather information as defined in claim 12 wherein the multimedia weather presentation further includes a graphic image of the meteorologist for the selected geographical region.

14. A method for providing weather information as defined in claim 12 wherein the graphic display of the meteorologist's weather forecast includes a graphic representation of forecast temperature ranges for a predetermined forecast period.

15. A method for providing weather information as defined in claim 14 wherein the graphic display of the meteorologist's weather forecast further includes an icon representative of the forecast weather condition for each day in the forecast period.

16. A method for providing weather information as defined in claim 14 wherein the graphic representation of forecast temperature ranges includes, for each day in the forecast period, a symbol having a vertical height that is representative of forecast temperature range and a vertical position that is representative of forecast temperature.

17. A method for providing weather information as defined in claim 12 wherein the step of compiling weather information from a plurality of meteorologists includes each of said meteorologists completing a computer weather information form, the information in said weather information form being electronically transmitted to said presentation generator.

18. A method for providing weather information as defined in claim 12 wherein the step of converting said weather information into presentation information includes providing a presentation template representative of said multimedia weather presentation, entering selected portions of said weather information into said presentation template to provide a completed presentation template, and rendering the completed presentation template into a digital representation of said multimedia weather presentation.

19. A method for providing weather information as defined in claim 12 wherein the multimedia weather presentation further includes animation comprising a series of related graphic display frames.

20. A method for providing weather information as defined in claim 12 wherein the multimedia weather presentation further includes a text weather forecast for the benefit of users that do not have a multimedia computer.

21. A method for providing outdoor information, comprising the steps of:

compiling outdoor information from a plurality of sources by electronically transmitting said outdoor information from each of said sources to a presentation generator, the step of compiling outdoor information including compiling weather information from a plurality of meteorologists in different geographical regions, said weather information including, for each meteorologist, weather forecast information generated by the meteorologist and an audio representation of the meteorologist's oral weather forecast;

said presentation generator converting said outdoor information from each of said sources into a presentation, including providing a software presentation template representative of said presentation, entering selected portions of said outdoor information into said presentation template to provide a completed presentation template, and rendering the completed presentation template into a digital representation of said presentation;

storing the digital representation of said presentation in a computer database that is accessible through an information transmission network;

receiving a request from a user device connected to the information transmission network for selected outdoor information; and in response to said request transmitting the digital representation of said presentation from said database to the user device through said information transmission network for generating said presentation, said presentation comprising a multimedia weather presentation including a graphic display of the meteorologist's weather forecast and an audio reproduction of the meteorologist's oral weather forecast.

22. A method for providing outdoor information as defined in claim 21 wherein the information transmission network comprises a computer network and said user device comprises a multimedia computer.

23. A method for providing outdoor information as defined in claim 21 wherein the step of compiling outdoor information includes compiling weather information and ski reports.

24. A system for providing weather information comprising:

means for compiling weather information from a plurality of meteorologists in different geographical regions by electronically receiving said weather information from each of said meteorologists, said weather information including, for each of said meteorologists, weather forecast information generated by the meteorologist and an audio representation of the meteorologist's oral weather forecast;

means for converting said weather information from each of said meteorologists into presentation information for generating a multimedia weather presentation for each of said geographical regions;

a database that is accessible through an information transmission network;

means for storing said presentation information in said computer database;

means for receiving a request from a user device connected to the information transmission network for selected weather information; and means responsive to said request for transmitting said presentation information corresponding to the selected weather information from said database to the user device through said information transmission network for generating said multimedia weather presentation, said multimedia weather presentation including a graphic display of the meteorologist's weather forecast and an audio reproduction of the meteorologist's oral weather forecast.

25. Apparatus for providing outdoor information comprising:

means for compiling outdoor information from a plurality of sources, including means for electronically receiving said outdoor information from each of said sources, said means for compiling outdoor information including means for compiling weather information from a plurality of meteorologists in different geographical regions, said weather information including, for each meteorologist, weather forecast information generated by the meteorologist and an audio representation of the meteorologist's oral weather forecast;

means for converting said outdoor information from each of said sources into presentation information for generating a multimedia presentation of said outdoor information, including means for providing a presentation template representative of the multimedia presentation, means for entering selected portions of said outdoor information into said presentation template to provide a completed presentation template, and means for rendering the completed presentation template into a digital representation of said multimedia presentation;

a computer database that is accessible through an information transmission network;

means for storing the digital representation of said multimedia presentation in said computer database;

means for receiving a request from a user device connected to the information transmission network for selected outdoor information; and means responsive to said request for transmitting the digital representation of said multimedia presentation from said database to the user device through the said information transmission network for generating said multimedia presentation, said presentation comprising a multimedia weather presentation including a graphic display of the meteorologist's weather forecast and an audio reproduction of the meteorologist's oral weather forecast.

* * * * *